United States Patent [19]

Sube et al.

[11] Patent Number: 5,245,867
[45] Date of Patent: Sep. 21, 1993

[54] METHOD AND APPARATUS FOR MEASURING TIRE PARAMETERS

[75] Inventors: H. James Sube; Larry E. Fritschel, both of Stow; James F. Siegfried, Medina; Arthur J. Dory; John L. Turner, both of Akron, all of Ohio

[73] Assignee: Bridgestone Corporation, Tokyo, Japan

[21] Appl. No.: 808,392

[22] Filed: Dec. 16, 1991

[51] Int. Cl.$^5$ .......................................... G01M 17/02
[52] U.S. Cl. .................................................... 73/146
[58] Field of Search ...................... 73/146; 356/4, 156, 356/160, 167

[56] References Cited

U.S. PATENT DOCUMENTS

| | | | |
|---|---|---|---|
| 3,918,816 | 11/1975 | Foster et al. | 73/146 |
| 4,095,464 | 6/1978 | Breedijk | 73/146 |
| 4,150,567 | 3/1979 | Prevorsek et al. | 73/146 |
| 4,225,238 | 9/1980 | Rottenkolber | 356/348 |
| 4,275,589 | 6/1981 | Dugger et al. | 73/146 |
| 4,311,044 | 1/1982 | Marshall et al. | 73/146 |
| 4,402,218 | 9/1983 | Engel | 73/146 |
| 4,440,018 | 3/1984 | Christie | 73/146 |
| 4,469,450 | 9/1984 | DiVincenzo | 374/119 |
| 4,653,316 | 3/1987 | Fukuhara | 73/146 |
| 4,670,289 | 6/1987 | Miller, III | 427/8 |
| 4,837,980 | 6/1989 | Rogers, Jr. | 51/165 R |
| 4,841,766 | 6/1989 | Haack | 73/146 |
| 4,907,447 | 3/1990 | Tanaka et al. | 73/146 |
| 4,918,976 | 3/1990 | Fogal, Sr. | 73/40.7 |
| 4,934,184 | 6/1990 | Tsuji | 73/146 |
| 4,936,138 | 6/1990 | Cushman et al. | 73/146 |
| 4,969,355 | 11/1990 | Doi et al. | 73/146 |
| 5,088,321 | 2/1992 | Kajikawa et al. | 73/146 |

Primary Examiner—Donald O. Woodiel
Attorney, Agent, or Firm—David A. Thomas

[57] ABSTRACT

A method and apparatus for circumferentially measuring tread wear on a tire. A laser probe sequentially scans each of the ribs of a tire, obtaining data respecting the tread depth at various points therealong. This data is employed for each rib to determine heel-to-toe irregular wear of the lugs thereof and to also determine a total wear index indicative of the degree of wear of the lugs. The method and apparatus is also adapted to laterally scan the tire sidewall to obtain data therefrom for the ascertaining of anomalies therein.

15 Claims, 3 Drawing Sheets

METHOD AND APPARATUS FOR MEASURING TIRE PARAMETERS

TECHNICAL FIELD

The invention herein resides in the art of apparatus and techniques for measuring and analyzing various parameters of a pneumatic tire. Specifically, the invention relates to such an apparatus and technique which employs a noncontact probe to acquire data from the tread surface, such data being arranged in a data matrix for analysis as to tread wear characteristics. More particularly, the invention relates to such an apparatus and technique which acquires such data from the tire ribs. Further, the concept of the invention extends to the acquisition and assessment of data from the tire sidewall.

BACKGROUND OF THE INVENTION

The current state of the art of irregular tire tread wear evaluation is substantially subjective. Those persons involved in evaluating irregular tire tread wear must see, and frequently touch, the actual tire under consideration in order to formulate a conclusion as to the causes of such irregular tire tread wear. Such techniques have rendered it virtually impossible to archive or otherwise maintain the data respecting the tires considered, for such data has, in large part, been nothing more than the mental process undertaken by the individual evaluating the tire. In the past, data respecting such tread wear has been stored by actual retention of the tire itself or, at least, portions thereof.

Additionally, the prior art techniques for evaluating irregular tire tread wear have made it extremely difficult to make accurate comparisons of tread wear from one tire to another, particularly when the differences in tread wear between the tires are extremely small. Additionally, there is a lack of both accuracy and consistency in unaided human perceptions as to the subjectivity of irregular tire wear evaluation.

The prior art is also substantially devoid of techniques for detecting anomalies in tire sidewalls. In the manufacture of pneumatic tires, the nature of splices and mating elements in the tire sidewall are of particular interest for structural integrity and appearance. Of similar interest are the presence of bulges, cord shrinkage, and the like.

There is a need in the art for a method and apparatus for measuring irregular tread wear which is capable of high resolution, accuracy, and repeatability. A need further exists for such a method and apparatus which is structurally compact and easily transported, simplistic in operation, and rapid in effecting the requisite data acquisition and analysis. Finally, a need exists for a simplistic method and apparatus for detecting anomalies in tire sidewalls.

DISCLOSURE OF INVENTION

In light of the foregoing, it is a first aspect of the invention to provide a method and apparatus for measuring tread wear in a pneumatic tire which eliminates subjectivity in the wear evaluation, permitting accurate quantification of irregular wear.

Still another aspect of the invention is the provision of a method and apparatus for measuring tread wear in a pneumatic tire which eliminates the need to archive or store the actual tire or portions thereof for the purpose of tread wear evaluation, allowing for ease of comparison among irregularly worn tires.

Another aspect of the invention is the provision of a method and apparatus for measuring tread wear which accentuates irregular wear through a computer aided display, making such wear easily detectable even when relatively small.

Yet a further aspect of the invention is the provision of a method and apparatus for measuring tread wear in which discrete data points in the form of a matrix covering the totality of the tread wear surface are generated, allowing for an accurate and rapid overview of the totality of the tread wear surface, further allowing for comparisons of one portion on the surface to others during the analysis process.

An additional aspect of the invention is the provision of a method and apparatus for measuring tread wear, the latter of which is transportable.

Yet another aspect of the invention is the provision of a method and apparatus for measuring tread wear which are rapid in data acquisition and analysis.

Still a further aspect of the invention is the provision of a method and apparatus for measuring tread wear which may rapidly and accurately determine heel-to-toe irregular wear and a total wear index for a tire.

Another aspect of the invention is the provision of a method and apparatus for measuring tread wear which measures tire ribs and the wear thereof.

An additional aspect of the invention is the provision of a method and apparatus for measuring tire tread wear and having the features aforesaid, and which also provides for the acquisition and assessment of data from the tire sidewall for detecting anomalies therein.

The foregoing and other aspects of the invention which will become apparent as the detailed description proceeds are achieved by an apparatus for measuring physical parameters of tires, comprising: first means for rotating the tire about the tire axis of rotation; a noncontacting probe in juxtaposition to the tread surface of the tire; and second means interconnecting said first means and said probe, for obtaining data from tread ribs circumferentially encompassing the tire and determining tread wear characteristics therefrom.

Other aspects of the invention are attained by a method for measuring physical parameters of a tire, comprising: rotating the tire about its axis of rotation; obtaining data from each of the ribs of the tire during the rotation thereof, said data corresponding to tread depth at spaced points along said rib; and determining tread wear characteristics of the tire as a function of said data.

DESCRIPTION OF DRAWINGS

For a complete understanding of the objects, techniques, and structure of the invention reference should be made to the following detailed description and accompanying drawings wherein.

BEST MODE FOR CARRYING OUT THE INVENTION

Figure 1:
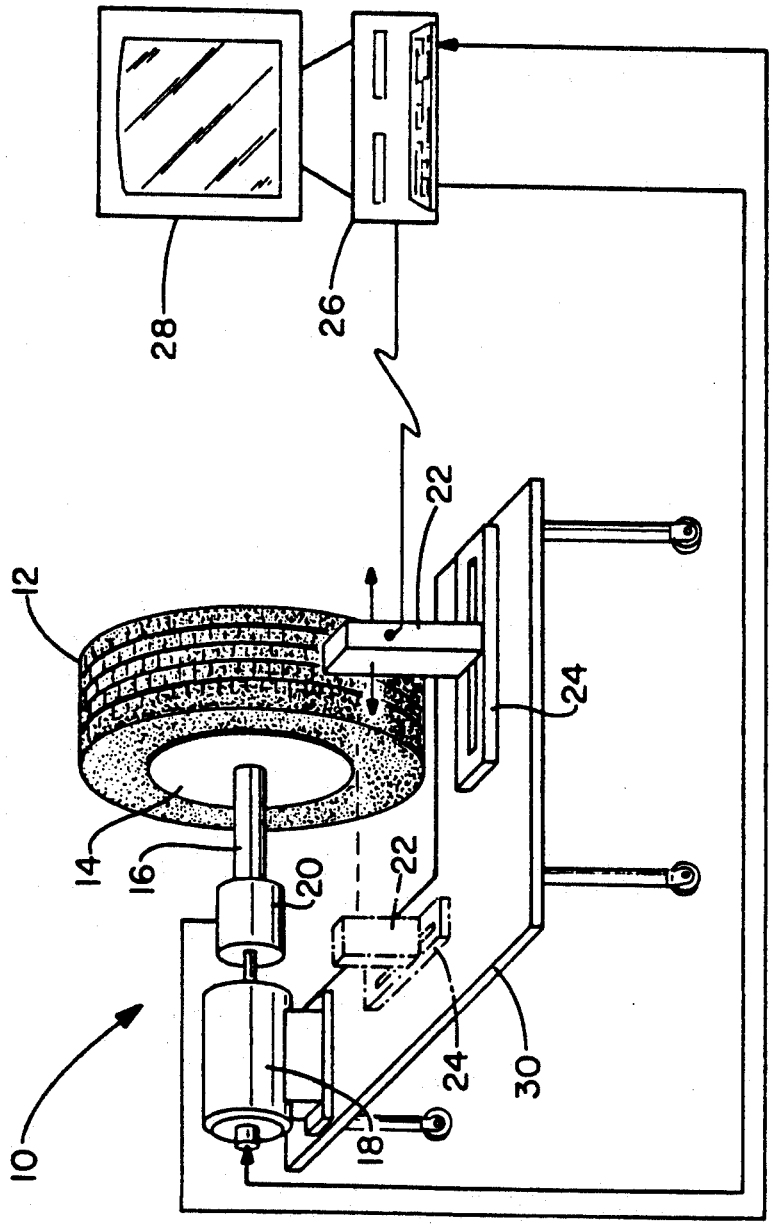
FIG. 1 is a schematic diagram of the tire parameter measuring apparatus of the invention.

Referring now to the drawings and more particularly FIG. 1, it can be seen that a tire parameter measurement system and apparatus according to the invention is designated generally by the numeral 10. As shown, a pneumatic tire 12 is mounted upon an appropriate wheel or rim 14 which is connected to a horizontal axle or shaft 16. The shaft 16 extends coaxial with the axis of rotation of the tire 12 such that the outer surface of the tread of the tire 12 generally forms a cylinder with the points thereof being equidistant from the axis of the shaft 16.

An appropriate drive mechanism or motor 18 is connected to and is operative to drive the shaft 16, causing the tire 12 to rotate about its rotational axis. An encoder 20 is connected to the shaft 16 and is provided for purposes of monitoring the rotation of the tire 12 and providing a constant indicia of the instantaneous position of points on the outer tread surface of the tire 12. The implementation of such encoders is well known and understood by those skilled in the art.

A suitable noncontact probe 22, such as a laser probe, is maintained in juxtaposition to the tire 12. Those skilled in the art will readily understand that the laser probe 22 provides a source of laser light and a sensor for receiving the reflection of such light from a surface upon which it is impinged. The laser probe 22 determines from the reflected light the distance between the probe and the reflective surface. According to the instant invention, the sensor of the probe 22 receives light reflected back from the tread surface of the tire 12.

The laser probe 22 is mounted upon a slide 24 such as a screw gear or the like and, in a first mode, is positioned so as to move parallel to the axis 16 and across the tread of the tire 12 to obtain data therefrom. In the second mode of operation, the laser probe 22 and slide 24 are positioned orthogonal to the axis of rotation for obtaining data from the sidewall of the tire 12. Of course, a pair of orthogonally positioned laser probes 22 and slides 24 may be employed, if desired.

A microprocessor or other appropriate control unit 26 is provided as the central controlling element of the system 10. An appropriate monitor or display screen 28 provides for visual communication with the microprocessor 26, the latter also being provided with a keyboard, printer, and the like for additional communications as is well known and understood by those skilled in the art. The microprocessor 26 communicates with the laser probe 22 and its slide table 24 to position the probe 22 laterally or radially with respect to the tire 12 and to obtain data therefrom. The microprocessor 26 further controls the actuation of the motor 18 and receives signals from the encoder 20 such that the exact rotational position of the tire 12 is always known.

In the preferred embodiment of the invention, the motor 18, actuated by the microprocessor 26, causes the tire 12 to rotate at a constant fixed speed about the tire axis of rotation. The laser probe 22 is positioned upon the slide 24 such that the laser beam from the probe 22 falls upon a first circumferential rib of the tire 12. Those skilled in the art will understand that the rib is generally comprised of a plurality of substantially circumferentially aligned individual lugs. With the tire 12 rotating at a fixed speed, and with the laser probe 22 operating at a set frequency, a predetermined number of data points are obtained from the aligned tire rib during one revolution of the tire 12. These data points correspond to the distance from the laser probe 22 to the accessed point on the tread surface of the tire 12 along the accessed rib. Accordingly, each such data point will effectively correspond to the distance of the data point from the central axis of the tire 12. The data points will, of course, fall upon either the lugs of the rib, or the surface of the groove between the lugs. The encoder 20 serves to identify circumferentially each of the data points obtained. Of course, the number of data points obtained from each revolution of the tire 12 will be a function of the rotational speed of the tire and the frequency of operation of the laser probe 22. In a preferred embodiment of the invention, approximately 4,000 such data points will be taken during each tire revolution.

After the data points have been taken from the first rib of the tire 12, the probe 22 is indexed upon the slide 24 under control of the microprocessor 26 such that the laser beam impinges upon the next tire rib location. A similar set of data is obtained and the indexing continues until a full compliment of data has been acquired from each of the tire ribs. This data may then be analyzed to determine tread wear characteristics of the tire 12.

Figure 2A:
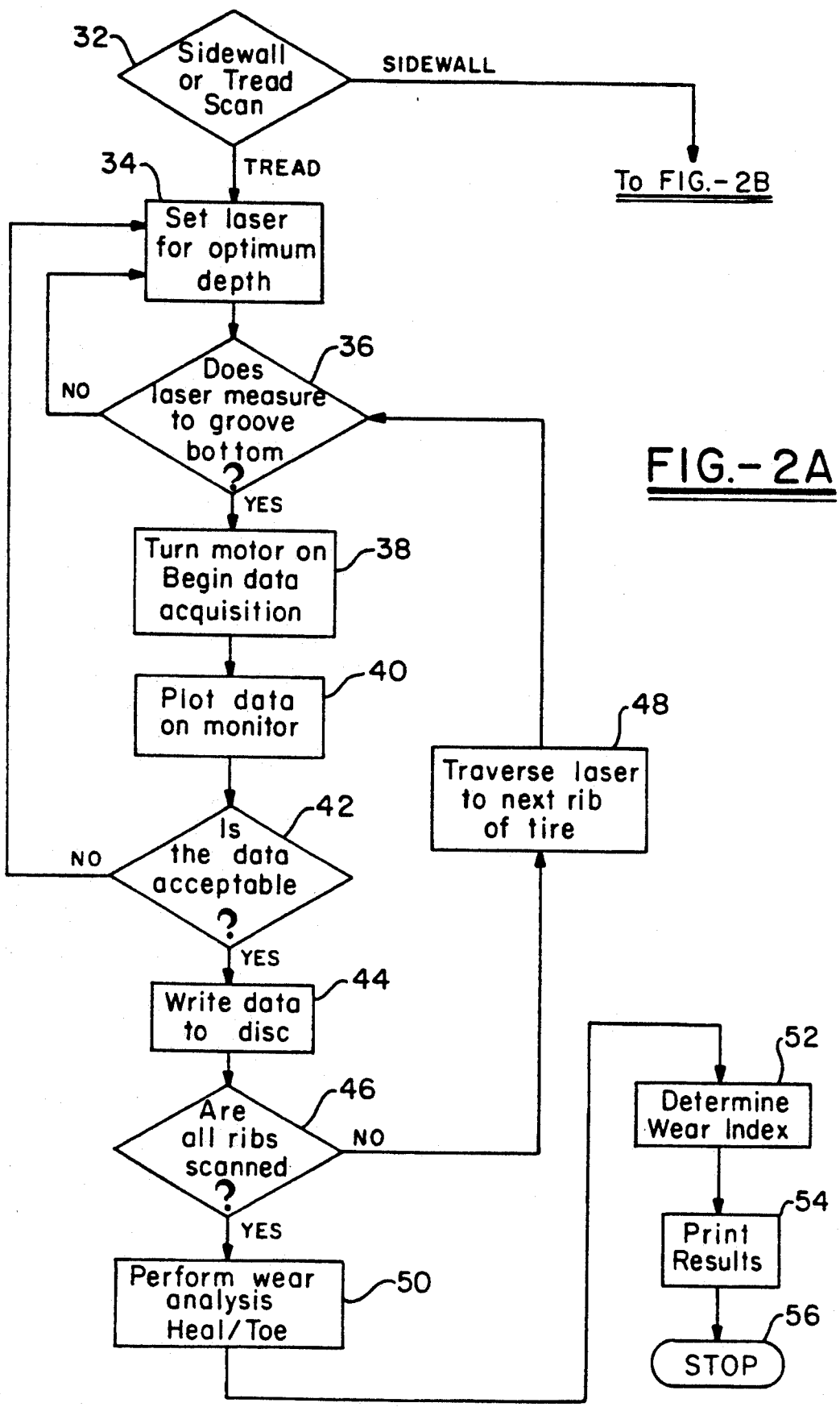
FIGS. 2A and 2B comprise is a flow chart diagram employed by the apparatus of FIG. 1 and comprising the method of the invention.
Figure 2B:
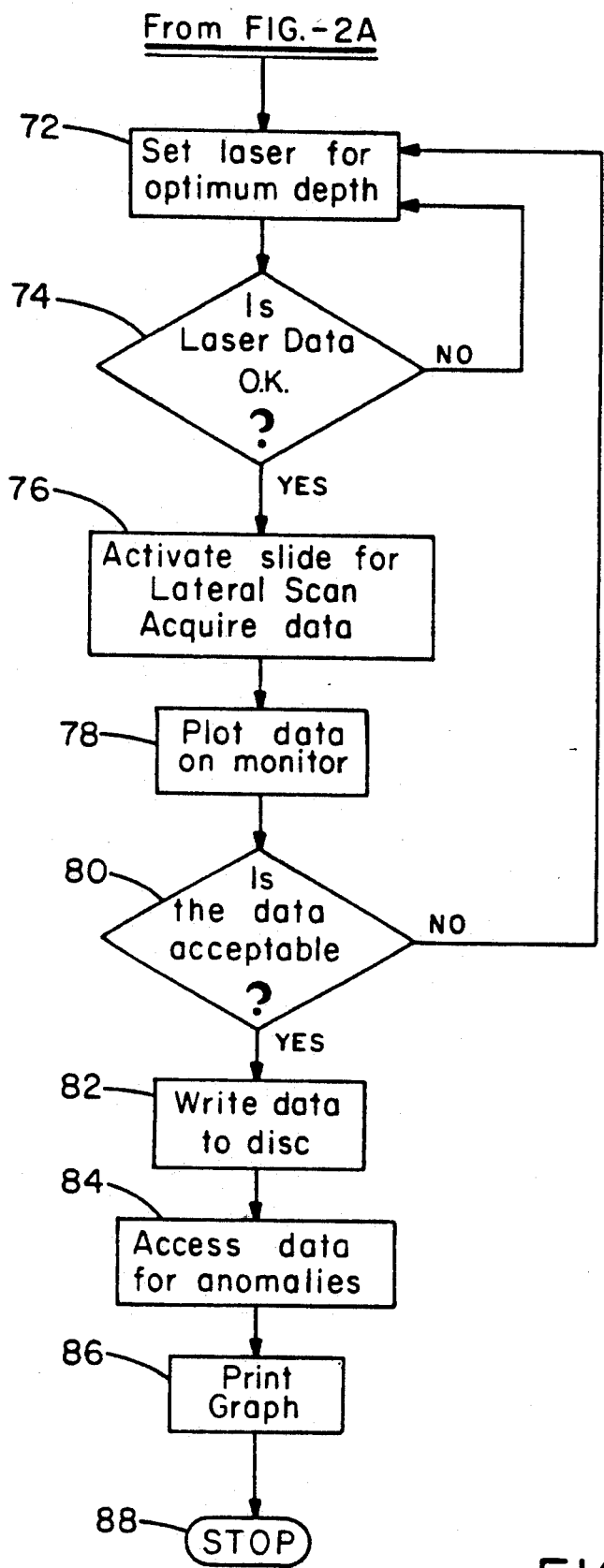

With reference now to FIGS. 2A and 2B, a detailed understanding of the method employed with the system 10 may be appreciated. The steps of the method accomodate acquisition and treatment of data from the sidewall or thread as determined at 32. For purposes of discussion, the tread will first be analyzed. As shown, at the step 34 the laser probe 22 is adjusted to be certain that the probe detects both the surface of the tread lugs and the grooves between the lugs. A determination is made at 36 as to whether the laser probe 22 can actually sense and measure the bottoms of the grooves between the lugs. If not, the laser probe 22 is adjusted until such sensing and measuring can be accomplished. At that point, the motor 18 is actuated as at 38 and data acquisition commences. The data acquired from the first rib of the tire 12 is plotted on monitor 28, as at 40. The data is compared against threshold standards to be certain that the data falls within an acceptable range. If the data viewed on the monitor 28 has unacceptable noise spikes, or is otherwise not acceptable, as determined at 42, the data acquisition process begins anew by resetting the laser for optimum depth as at 34 to acquire a new set of data, and the process continues until the data is shown to be acceptable. When acceptable data is achieved as at 42, the data is entered onto a memory disc 44 which would typically comprise a portion of the microprocessor 26. After the data is written, a determination is made as to whether all of the tire ribs have been scanned. If all of the ribs have not been scanned, as determined at 46, the microprocessor 26 indexes the slide 24 to move the probe 22 to the next tire rib as at 48. Again, a determination is made at 36 as to whether the laser probe 22 can measure to the bottoms of the grooves between the lugs forming the tire ribs. If not, the laser probe 22 is adjusted for optimum depth until the bottom of the grooves can be sensed and measured. At this point, the data acquisition steps 28–44 are engaged for the next tire rib and the data entered onto an appropriate disc for future use. This process continues until all of the tire ribs have been scanned as determined at the decision block 46.

Figure 3:
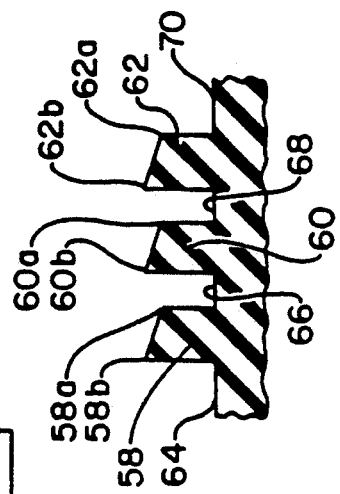
FIG. 3 is a partial cross sectional view of a tire tread rib showing the lugs thereof and measurement points of interest in the analysis of tire wear performed by the invention.

When a full compliment of data has been obtained for each of the ribs of the tire 12, various analyses may be undertaken with respect to the data. As shown in block 50, a heel-to-toe analysis may be made on each of the lugs of each of the circumferential tire ribs. As shown in FIG. 3, a plurality of tread lugs 58, 60 and 62 of a tire rib are shown with groove bottoms 64, 66, 68 and 70 therebetween. As further shown, each of the lugs 58, 60 and 62 demonstrates uneven wear from the respective heels 58a, 60a and 62a to the respective toes 58b, 60b and 62b. Those skilled in the art will understand that the terms "heel" and "toe" with respect to a tire tread lug respectively refer to the first and last portions of the lug to contact a planar support surface during operation. As a portion of the instant invention, the heel-to-toe irregular wear of each of the lugs of each circumferential rib is determined by substracting the height of the toe from the height of the corresponding heel. For example, the height of the point 58a substracted from the height of the point 58b would constitute the heel-to-toe irregular wear of the lug 58. Similarly, the height of the point 60a subtracted from the height of the point 60b would constitute the heel-to-toe irregular wear of the lug 60. It will be appreciated that such irregular wear would be zero for those lugs demonstrating even wear.

In performing the heel-to-toe analysis 50 in the method of FIGS. 2A and 2B, the heel-to-toe irregular wear of the lugs demonstrating the greatest departure from zero are displayed on the monitor 28. In the preferred embodiment, the three lugs demonstrating the greatest departure from zero for each of the circumferential ribs are displayed. Of course, it is understood that the microprocessor 26 may average the irregular wear values for all of the lugs of each rib and display this average, and may also average the irregular wear for all such lugs for the entire tire and display that average. Such information may be used to determine problems with compounding of the tread rubber or construction features of the tire 12.

It is also contemplated that a total wear index may be determined as at 52 in the process of FIGS. 2A and 2B. Here, the average height of each of the lugs of each of the circumferential tread ribs may be determined for the tire 12. In a preferred embodiment of the invention, the lugs demonstrating the highest degree of total wear may be identified and quantified on the monitor 28. The average height of each of the lugs for each of the ribs may also be determined since an average total wear for each rib may be displayed on the monitor 28. Such information can be employed as a wear index to demonstrate the amount of total wear experienced by the tire 12.

The test results from the steps 50, 52 may be printed or otherwise displayed as at 54 before the conclusion of the test process as at 56.

According to the concept of the invention, a lateral scan of the sidewall of the tire 12 may also be undertaken to obtain data therefrom. Those skilled in the art will appreciate that such a scan across the sidewall of the tire can acquire information respecting sidewall anomalies such as result from bulges, cord shrinkage, splices, and the like. As shown in FIG. 1, the slide 24 and laser probe 22 are, for such purposes, moved to a position orthogonal to that used for scanning the tire tread. The position for achieving the sidewall scan is shown in phantom in FIG. 1. In this instance, the laser probe 22 is adapted for movement upon the slide 24 in a direction orthogonal to the axis of rotation of the tire 12.

Referring again to FIGS. 2A and 2B, selection of the process for a sidewall scan can be made at decision block 32. At this point, the laser probe 22 is set as at 72 to obtain optimum depth. The position of the laser probe 22 to achieve acceptable data as evidenced on the monitor 28 is continued through decision block 74 and positional adjustment is made as at 72 until the data is acceptable. At that time, the slide 24 is activated under control of the microprocessor 26 such that the laser probe 22 laterally scans the sidewall of the tire 12, acquiring data from the surface thereof along the radial line of scan. The data acquired from the operation 76 is then plotted at 78 on the monitor 28. At the decision block 80, a determination is made as to whether the data so obtained is acceptable. If not, a return is made to operation 72 for repositioning of the laser probe 22 for an assurance of the acquisition of acceptable data. The process then continues. When the determination is made at 80 that the data is acceptable, the data is written to a memory disc at 82. The data is then analyzed or assessed at 84 for indications of anomalies such as tire sidewall bulges, splices, or cord shrinkage. Upon completion of this assessment at 84, a graph may be printed at 86 or displayed upon the monitor 28, indicating the position, nature, and degree of anomalies sensed. The program is then terminated at 88.

It has been found that a suitable analysis of the tire sidewall may be made by a single lateral scan thereacross. However, as a portion of the invention, it is also contemplated that the process for the sidewall analysis as set forth in FIGS. 2A and 2B may also include indexing of the tire 12 about its axis of rotation such that data may be acquired from radial scan lines across the tire sidewall at various points about the tire.

Thus it can be seen that the objects of the invention have been satisfied by the structure presented above. A test apparatus which may be easily maintained upon a table 30 or other appropriate support device may be employed for circumferentially monitoring and measuring points upon the tread of a tire 12 and determining therefrom various wear indicia such as heel-to-toe irregular wear and total wear indices. Additionally, the apparatus may be employed to scan the tire sidewall to obtain information and data regarding bulges, splices, and cord shrinkage. All of this information may be used to determine anomalies in the tire or in the vehicle employing the tire.

While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. An apparatus for measuring physical parameters of tires, comprising:
    first means for rotating the tire about the tire axis of rotation;
    a non-contacting probe positionable in juxtaposition to the tread surface of the tire; and
    second means interconnecting said first means and said probe, for obtaining data from tread ribs circumferentially encompassing the tire and determining tread wear characteristics therefrom, wherein said data is obtained from a plurality of points about each tire rib, said data for each said point being an indication of tread depth at such point, said second means indexing said probe from one rib to another radially across the tire, assuring that data points for each rib are obtained about the entire circumference of the tire, and said second means determining heel-to-toe wear of tread lugs of the tread ribs.

2. The apparatus according to claim 1 wherein said second means identifies the greatest heel-to-toe wear in each tread rib of the tire.

3. The apparatus according to claim 1 wherein said first means comprises a motor and an encoder connected to the tire.

4. The apparatus according to claim 1 wherein said probe comprises a laser probe.

5. A method for measuring physical parameters on a tire, comprising:
    rotating the tire about its axis of rotation;
    obtaining data from each of the ribs of the tire during rotation thereof, said data corresponding to treat depth at spaced points along said rib;
    determining tread wear characteristics of the tire as a function of said data; and
    wherein said data is taken from each rib at uniformly spaced data points about the entire circumference thereof, and said tread wear characteristics are determined from heel-to-toe wear of the lugs of each of said ribs.

6. The method according to claim 5 wherein said data is obtained from a laser probe indexed laterally across said tire to sequentially scan and obtain data from said ribs.

7. The method according to claim 5, wherein a maximum heel-to-toe wear for each tire rib is determined.

8. The method according to claim 5, wherein said tread wear characteristics are determined from establishing an average lug height for each tire rib.

9. The method according to claim 8, wherein said tread wear characteristics are further established by determining a minimum lug height for each tire rib.

10. The method according to claim 5, further comprising the step of obtaining data from the sidewall of the tire and determining the presence of anomalies in the sidewall therefrom.

11. An apparatus for measuring physical parameters of tires, comprising:
    first means for rotating the tire about the tire axis of rotation;
    a non-contacting probe positionable in juxtaposition to the tread surface of the tire; and
    second means interconnecting said first means and said probe, for obtaining data from tread ribs circumferentially encompassing the tire and determining tread wear characteristics therefrom, wherein said data is obtained from a plurality of points about each tire rib, said data for each said point being an indication of tread depth at such point, said second means indexing said probe from one rib to another radially across the tire, assuring that data points for each rib are obtained about the entire circumference of the tire, and said second means further establishing a wear index for each tire rib, such wear index being an average tread lug height for each said rib.

12. The apparatus according to claim 11 wherein said second means further identifies the height of the tread lug of the least height for each tire rib.

13. An apparatus for measuring physical parameters of tires, comprising:
    first means for rotating the tire about the tire axix of rotation;
    a non-contacting probe selectably positionable in juxtaposition to one of the tread surface and sidewall surface of the tire; and
    second means interconnecting said first means and said probe, for obtaining data from tread ribs circumferentially encompassing the tire and determining tread wear characteristics therefrom when positioned in juxtaposition to the tread surface and obtaining data from the sidewall surface and detecting anomalies in the sidewall therefrom when positioned in juxtaposition to the sidewall surface.

14. The apparatus according to claim 13 wherein said first means is inactive and the tire remains stationary while said second means obtains said data from the sidewall surface.

15. The apparatus according to claim 14 wherein said second means radially scans the sidewall surface with said non-contacting probe.

* * * * *